United States Patent
Swenson et al.

(10) Patent No.: US 8,655,538 B2
(45) Date of Patent: Feb. 18, 2014

(54) SYSTEMS AND METHODS FOR SWITCHING DISPLAY MODES IN AGRICULTURAL VEHICLES

(75) Inventors: Edward L. Swenson, Emory, TX (US); Paul Matthews, Bel Aire, KS (US)

(73) Assignee: AGCO Corporation, Duluth, GA (US)

( * ) Notice: Subject to any disclaimer, the term of this patent is extended or adjusted under 35 U.S.C. 154(b) by 166 days.

(21) Appl. No.: 13/328,825

(22) Filed: Dec. 16, 2011

(65) Prior Publication Data

US 2013/0158772 A1    Jun. 20, 2013

(51) Int. Cl.
*G05D 1/00* (2006.01)
*B60T 7/12* (2006.01)

(52) U.S. Cl.
USPC .............................................. 701/25; 701/89

(58) Field of Classification Search
USPC ..................................................... 701/25, 89
See application file for complete search history.

(56) References Cited

U.S. PATENT DOCUMENTS

| 7,673,719 B2 | 3/2010 | Buschena |
| 7,967,101 B2 | 6/2011 | Buschena |
| 2005/0171693 A1 * | 8/2005 | Lange et al. .................. 701/209 |

OTHER PUBLICATIONS

"EZ-Guide 500 Lightbar Guidance System Quick Reference Card" Trimble Navigation Limited, Dec. 2007.*

* cited by examiner

*Primary Examiner* — Fadey Jabr
*Assistant Examiner* — Yazan A Soofi
(74) *Attorney, Agent, or Firm* — Hovey Williams LLP

(57) ABSTRACT

A display system for an agricultural vehicle includes a display for displaying a representation of the vehicle's location in a field in which the vehicle is operating and a control device for receiving an indication of an operating state of the vehicle and for controlling a viewing mode of the display according to the operating state.

14 Claims, 4 Drawing Sheets

SYSTEMS AND METHODS FOR SWITCHING DISPLAY MODES IN AGRICULTURAL VEHICLES

BACKGROUND

1. Field

Embodiments of the present invention relate to display systems for agricultural vehicles. More particularly, embodiments of the invention relate to display systems that switch between display modes.

2. Related Art

Modern agricultural vehicles are often equipped with Global Positioning System (GPS) receivers or other Global Navigation Satellite Systems (GNSS) for determining their locations or positions while they are operated. Agricultural vehicles are also often equipped with displays for displaying representations of these positions on maps or other cartographic displays. The displays can often be adjusted to present different views such as perspective views, top views, etc. and to provide different magnification or zoom levels.

Many operators desire to switch between views and/or magnification levels as they drive. For example, many operators find it useful and aesthetically pleasing to see a perspective or horizon view while traveling across a field so they can see marked obstacles, boundaries, etc. and to switch to a top or plan view when approaching a field boundary and/or while turning to assist with aligning the vehicle for another pass down the field. Similarly, many operators wish to see wide-angle views while traveling across a field and magnified views while approaching a field boundary.

Many known display systems permit operators to switch between views, magnification levels, and other display modes, but require manual activation of switches, touch-screen controls and the like to do so. This is inconvenient and distracts the operators from other tasks.

Accordingly there is a need for improved systems and methods for switching display modes in agricultural vehicles.

SUMMARY

Embodiments of the present invention solve the above-described problems and/or other problems by providing improved systems and methods for switching between display modes in agricultural vehicles. Particularly, embodiments of the invention provide a display system that automatically switches between display modes based on triggers that don't require manual activation.

One embodiment of the display system broadly comprises a display and a control device. The display shows a representation of the vehicle's location, and the control device receives an indication of an operating state of the vehicle and controls a viewing mode of the display according to the operating state.

For example, the operating state may be a position or orientation of an implement coupled with the vehicle, and the viewing mode may be a field of view of the display. The control device may be configured to switch the display to a perspective view whenever the implement is raised and to switch the display to a top view whenever the implement is lowered.

In another embodiment, the operating state may be a status of a sprayer coupled with the vehicle, and the control device may be configured to switch the display to a perspective view whenever the sprayer is disabled and to switch the display to a top view whenever the sprayer is being operated.

In yet another embodiment, the operating state may be a location of the vehicle relative to a field boundary, and the control device may be configured to switch the display to a perspective view whenever the vehicle is greater than a threshold distance from the boundary and to switch the display to a top view whenever the vehicle is less then the threshold distance from the boundary.

In some embodiments, the display system may be incorporated in a vehicle guidance system. The vehicle guidance system may comprise a satellite system receiver for determining locations of the agricultural vehicle; a display for displaying a representation of the vehicle's location; and a control device. The control device receives location data from the satellite system receiver and compares the location data to cartographic data for a desired path of the vehicle and produces steering commands to be delivered to a steering actuator. The control device also receives an indication of an operating state of the vehicle and controls a viewing mode of the display according to the operating state as explained above. For example, in addition to the operating states and viewing modes discussed above, the control device may be configured to switch the display to a perspective view whenever the vehicle guidance system is engaged and to switch the display to a plan view whenever the vehicle guidance system is disengaged.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

BRIEF DESCRIPTION OF THE DRAWINGS

Embodiments of the present invention are described in detail below with reference to the attached drawing figures, wherein.

Figure 1:
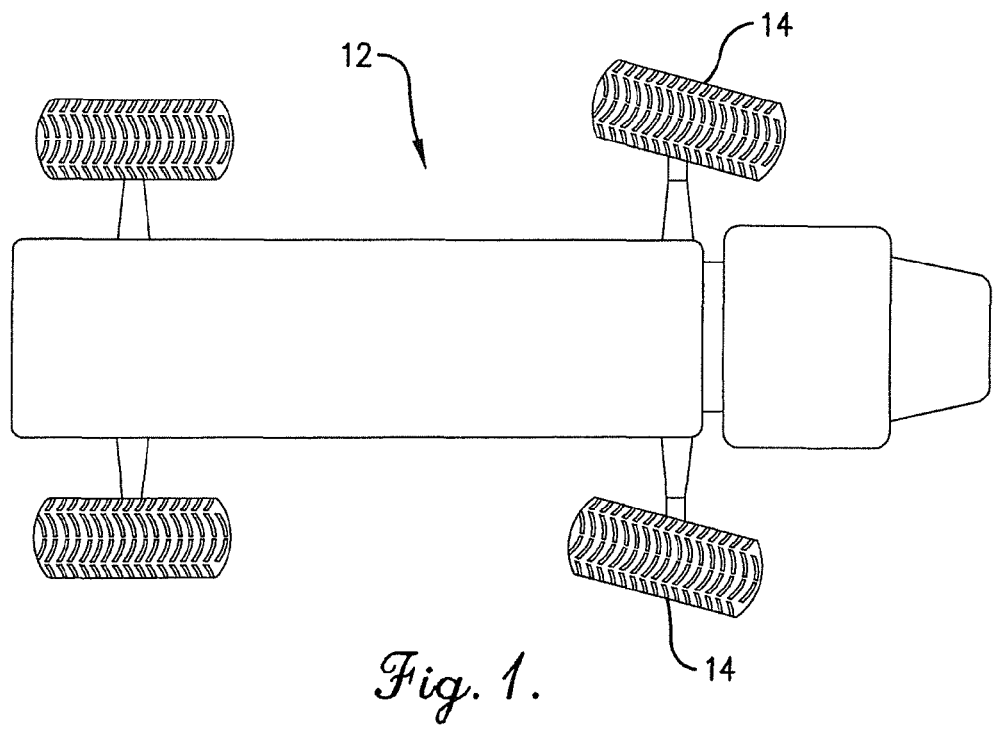
FIG. 1 is a schematic plan view of an agricultural vehicle in which the display system of the present invention may be installed.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Embodiments of the present invention provide a display system 10 that may be mounted in or on a tractor, combine, forage harvester, windrower, applicator, truck or any other self-propelled vehicle 12 primarily used for farming or other agricultural purposes. As illustrated in FIG. 1, the vehicle 12 may include a plurality of wheels 14, with at least one wheel being operable to turn, pivot, and/or rotate about a center axis to steer the vehicle 12. Alternatively, the vehicle 12 may include steerable belts and tracks rather than wheels.

The display system 10 can be implemented in hardware, software, firmware, or a combination thereof. An exemplary embodiment of the display system 10 may be incorporated in a vehicle guidance system. Vehicle guidance systems assist operators in following desired routes across a field, such as a route consisting of parallel paths a specified distance apart. The ability to accurately and consistently follow a specific route reduces overlap or underlap of chemicals, seeds, fertilizers, or other applications, improves weed control and seed/plant establishment, reduces overall driving distance, saves fuel and time, and reduces operator fatigue.

The display system 10 may alternatively be incorporated in other systems such as a control system for a fertilizer, herbicide, and/or pesticide applicator or a navigation system. The display system 10 may even be a stand-alone system.

Figure 2:
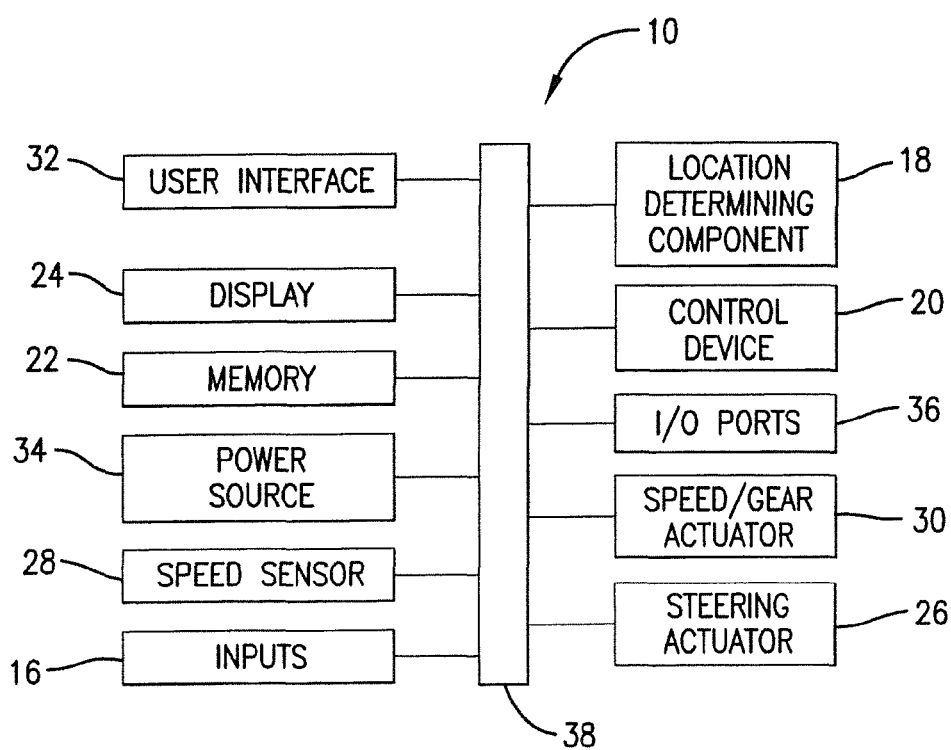
FIG. 2 is a block diagram illustrating certain components of an embodiment of the display system.

An embodiment of the display system 10 that is incorporated in a vehicle guidance system is illustrated in FIG. 2 and broadly comprises one or more inputs 16, a location-determining component 18, at least one control device 20, memory 22, and a display 24. When incorporated in a vehicle guidance system, the system 10 may also include a steering actuator 26, a speed sensor 28, and a speed/gear actuator 30. Embodiments of the system 10 may also comprise a user interface 32, a power source 34, one or more I/O ports 36, and/or other electronic components.

The inputs 16 may be any wireless or wired device or devices capable of receiving signals or data from external sources and transferring the signals or data to the control device 20. The inputs 16 may comprise, for example, one or more Ethernet ports, USB Ports, memory card slots, video ports, radio frequency (RF) receivers, infrared (IR) receivers, Wi-Fi receivers, Bluetooth devices, electrical terminals, or even electrical wires.

The inputs 16 may receive signals or data from one or more agricultural systems mounted on or attached to the agricultural vehicle. The agricultural systems may comprise any device or component that performs some agricultural function and that generates a signal or data indicative of its operating state. For example, the agricultural systems may include an implement such as a plow, tiller, planter, hay baler, etc. and a related sensor or control device that can generate a signal to indicate whether the implement is being used. The agricultural systems may also comprise an applicator or sprayer and a valve, control device, etc. that indicates whether the applicator or sprayer is enabled or disabled.

The inputs 16 may also receive signals or data from sensors that measure or sense operating states of the vehicle such as fuel level, engine temperature, ambient temperature, speed, steering angle, and the like. The inputs 16 may also receive signals or data from transmitters, receivers, transceivers, and other devices that receive operating state data from external sources. For example, weather data may be received from an external weather receiver and/or location data may be received from a global positioning system (GPS) receiver or other satellite navigation receiver.

The location-determining component 18 determines locations or positions of the vehicle 12 as it is driven from place to place and generates and sends corresponding position data to the control device 20. In one embodiment, the location-determining component 18 may be a satellite navigation receiver that works with a global navigation satellite system (GNSS) such as the global positioning system (GPS) operated by the United States, the GLONASS system operated the Soviet Union, or the Galileo system operated by Europe.

The location determining component 18 may send calculated positional information to the control device 20 to determine track logs or any other series of geographic coordinates corresponding to points along a path traveled by the vehicle 12. The control device 20 may also be operable to calculate routes to desired positions, provide instructions to navigate to the desired positions, display maps and other information on the display 24, and execute other functions as described herein.

The location-determining component 18 may include an antenna to assist in receiving the satellite signals. The antenna may be a any type of antenna that can be used with navigational devices to receive satellite signals.

Although one embodiment of the location-determining component 18 is a GNSS receiver, it may be any device capable of determining locations of the vehicle. For example, in other embodiments of the invention, the location determining component 18 may determine the vehicle's locations by receiving position information directly from the user, through a communications network, or from another electronic device.

The location determining component 18 may include one or more processors, controllers, or other control devices and memory so that it may calculate position and other geographic information with or without the control device 20. Or, the location determining component 18 may be integral with the control device 20 such that the location determining component 18 may be operable to specifically perform the various functions described herein. Thus, the control device 20 and location determining component 18 can be combined or be separate or otherwise discrete elements.

The control device 20 receives data or signals from the inputs 16 and the location determining component 18 and performs the functions described herein. The control device 20 may include any number of processors, controllers, integrated circuits, programmable logic devices, or other control devices and resident or external memory for storing data and other information accessed and/or generated by the display system 10. The control device 20 is preferably coupled with the other components of the guidance system through wired or wireless connections, such as a data bus 38, to enable information to be exchanged between the various components.

The control device 20 may implement one or more computer programs and/or code segments to perform the functions described herein. The computer programs may comprise ordered listings of executable instructions for implementing logical functions in the control device 20 such as the steps illustrated in FIG. 7 and described below.

The computer programs of the present invention can be embodied in any computer-readable medium. In the context of this application, a "computer-readable medium" can be any means that can contain, store, communicate, propagate, or transport the program for use by or in connection with the control device 20 or other instruction execution system, apparatus, or device. The computer-readable medium can be, for example, an electronic, magnetic, optical, electro-magnetic, infrared, or semi-conductor system, apparatus, device or propagation medium. More specific, although not inclusive, examples of the computer-readable medium include: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In some embodiments, the control device 20 may comprise a control module programmed with control algorithms and operable to receive real-time position information from the location determining component 18 and desired path parameters from any external or internal source. The control module may process this data in order to produce a plurality of output commands, such as desired wheel speed and desired wheel angle for given points in time. The output commands are used to generate a steering signal to be sent to the steering actuator 26. The system 10 may additionally receive user input from the user interface 32 when the system 10 is placed in a "manual" mode. Additionally, the system may receive user input to define an acceptable amount of deviation between the actual angle of the wheels and the desired angle.

The memory 22 may store various data associated with the operation of the system 10, such as the computer programs and code segments mentioned above, or other data for instructing the control device 20 and other system elements to perform the steps described herein. The memory 22 may store, for example, a look-up table or other memory structure that stores data representative of various operating states of the vehicle and various display viewing modes that correspond to each operating state. An example of such a table is listed below. The memory 22 may also store various cartographic data corresponding to geographic positions including map data and map elements, such as terrain, alert positions, points of interest, geographic entities, radio stations, and other navigation data to facilitate the various navigation functions provided by the system 10. Additionally, the memory 22 may store cartographic data for desired paths or routes across a field and other data for later retrieval by the control device 20. The various data stored within the memory 22 may also be associated within one or more databases to facilitate retrieval of the information. Data can also be stored on a device on the data bus 36 as well.

The memory 22, may be integral with the location determining component 18, integral with the control device 20, stand-alone memory, or a combination of both. The memory may include, for example, removable and non-removable memory elements such as RAM, ROM, flash, magnetic, optical, USB memory devices, and/or other conventional memory elements.

The display 24 may be used to display various information corresponding to the vehicle 12 and the display system 10, such as maps, positions, and directions. In accordance with one important aspect of the invention, the control device 20 or other control devices may switch the views, magnification levels, or other viewing modes of the display according to different operating states of the vehicle as described in more detail below.

The display 24 may comprise conventional black and white, monochrome, or color display elements including CRT, TFT, LCD, and/or plasma display devices. Preferably, the display 24 is of sufficient size to enable a user to easily view it while driving the vehicle 12. The display 24 may be integrated with the user interface 32, such as in embodiments where the display 24 is a touch-screen display to enable the user to interact with it by touching or pointing at display areas to provide information to the guidance system 10.

The steering actuator 26 is operable to steer one or more of the vehicle's wheels 14 in response to control signals from the control device 20. The steering actuator 26 may employ any known actuator technologies including hydraulic or mechanical actuators, electro mechanical actuators, or full electrical actuator systems. A feedback system may monitor the actual amount of steering provided by the steering actuator 26 to permit the control device 20 to compensate for any detected steering errors.

The speed sensor 28 is conventional and detects or monitors the speed of the vehicle 12. Likewise, the speed/gear actuator 30 is conventional and controls a speed and/or the gears of the vehicle 12 in response to control signals from the control device. Changes in the engine speed may also be made to control ground speed.

The user interface 32 permits a user to interact with the control device 20. The user interface 32 may comprise one or more functionable inputs such as buttons, switches, scroll wheels, a touch screen associated with the display 24, voice recognition elements such as a microphone, pointing devices such as mice, touchpads, tracking balls, styluses, a camera such as a digital or film still or video camera, combinations thereof, etc. Further, the user interface 32 may comprise wired or wireless data transfer elements such as a removable memory including the memory 22, data transceivers, etc., to enable the vehicle operator and other devices or parties to remotely interface with the system 10. The user interface may also include a speaker for providing audible instructions and feedback.

The user interface 32 may be operable to provide various information to the user utilizing the display 24 or other visual or audio elements such as the speaker. Thus, the user interface 32 enables the user to provide information relating to the system 10, including geographic entities, configuration information security information, preferences, route information, points of interests, alerts and alert notification, navigation information, waypoints, a destination address, etc.

The power source 34 provides electrical power to at least some of the system 10 components. For example, the power source 34 may be directly or indirectly coupled with the location-determining component 18, the control device 20, the display 24, the memory 22, and the user interface 32. The power source 34 may comprise conventional power supply elements such as batteries, battery packs, etc. The power source 36 may also comprise power conduits, connectors, and receptacles operable to receive batteries, battery connectors, or power cables.

The I/O ports 36 permit data and other information to be transferred to and from the control device 20 and the location-determining component 18. The I/O ports 36 may include a TransFlash card slot for receiving removable TransFlash cards and a USB port for coupling with a USB cable connected to another control device such as a personal computer. Navigational software, cartographic maps, and other data and information may be loaded in the guidance system 10 via the I/O ports 38.

Some of the components illustrated in FIG. 2 and described herein may be housed together in a protective enclosure. However, the components need not be physically connected to one another since wireless communication among the various components is possible and intended to fall within the scope of the present invention.

Figure 7:
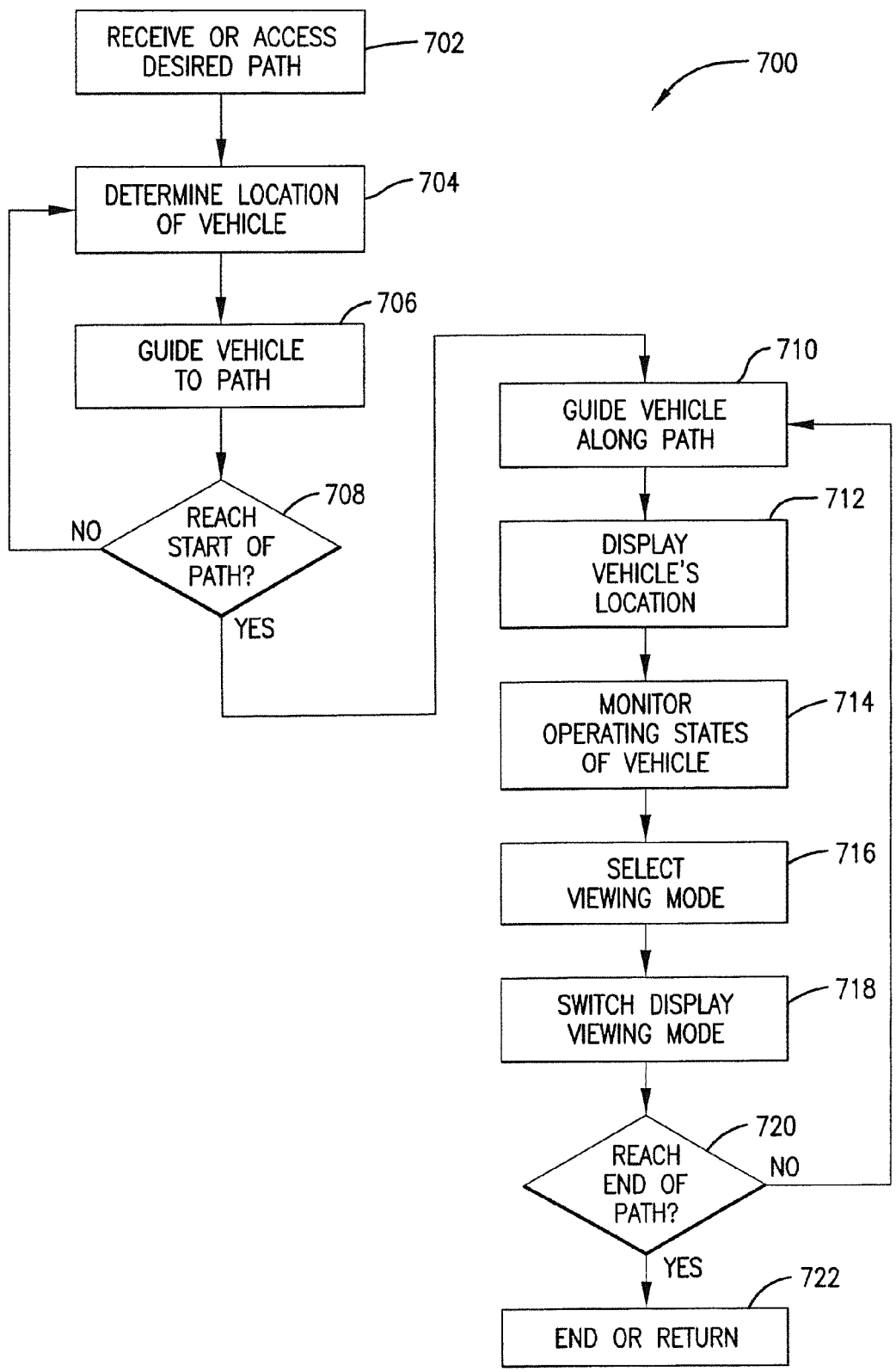
FIG. 7 is a flow chart illustrating selected steps of a method in accordance with embodiments of the invention.

FIG. 7 illustrates certain steps in an exemplary method 700 of using the system 10 or a similar device. Some or all of the steps may be implemented by the control device 20, by computer programs stored in or accessed by the control device 20, or by other components in communication with the control device 20. The particular order of the steps illustrated in FIG. 7 and described herein can be altered without departing from the scope of the invention. For example, some of the illustrated steps may be reversed, combined, or even removed entirely.

In step 702, the system 10 or other device receives or otherwise accesses cartographic data or other data that represents a desired route or path across a field or other area. For example, the route may consist of a number of parallel paths in a field a specified distance apart. The route may take into account the boundaries of the field and any known obstacles such as buildings, trees, fences, etc. The system 10 or other device may display several optional routes or paths and permit the vehicle operator to select one. The route data may be obtained from any source such as a separate computer or network running conventional agricultural mapping software.

In step 704, the system 10 or other device determines the current location of the vehicle 12. As mentioned above, this may be done with the location determining component 18 or any other device or method capable of calculating the location of the vehicle. Although FIG. 7 only depicts several steps in which the location of the vehicle is determined, the system 10 or other device may periodically or continuously receive updated location data to accurately pinpoint the location of the vehicle at all times.

In step 706, the system 10 or other device guides the vehicle 12 to the start of the desired path. This may be done by providing visual or audible turn instructions to the vehicle operator or by providing steering and control signals to the steering actuator 26 and speed/gear actuator 30 to automatically guide the vehicle to the starting location.

In step 708, the control device 20 or other device compares the current location of the vehicle 12 with the starting point of the desired path. If the vehicle has reached the starting point, the method proceeds to step 710, otherwise it repeats steps 704-708 until the starting point is reached.

Once the vehicle reaches the starting point of the desired path, the system 10 may guide the vehicle along the path as depicted in step 710. This may be done by providing visual or turn instructions to the vehicle operator or by providing steering and control signals to the steering actuator 26 and speed/gear actuator 30.

Figure 3:
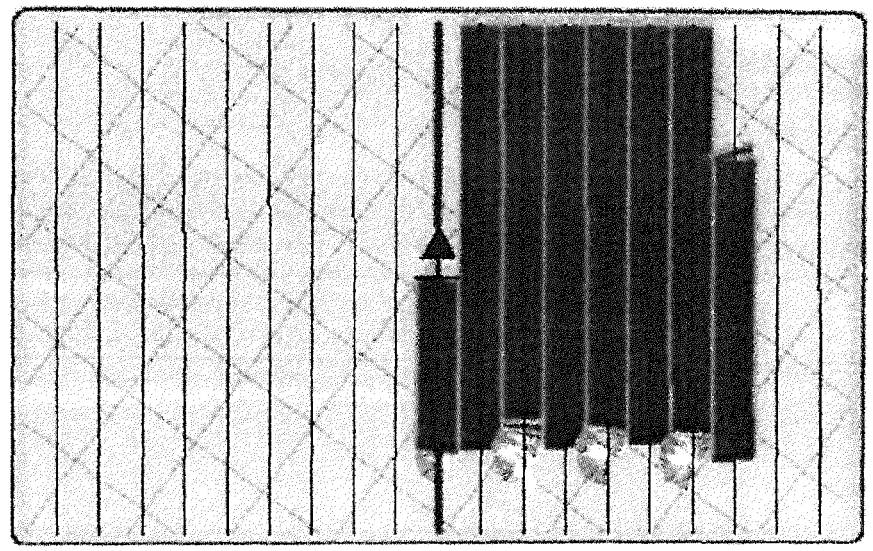
FIG. 3 is an exemplary screen display of the display system showing a top view representation of the vehicle's current location on a cartographic map.
Figure 4:
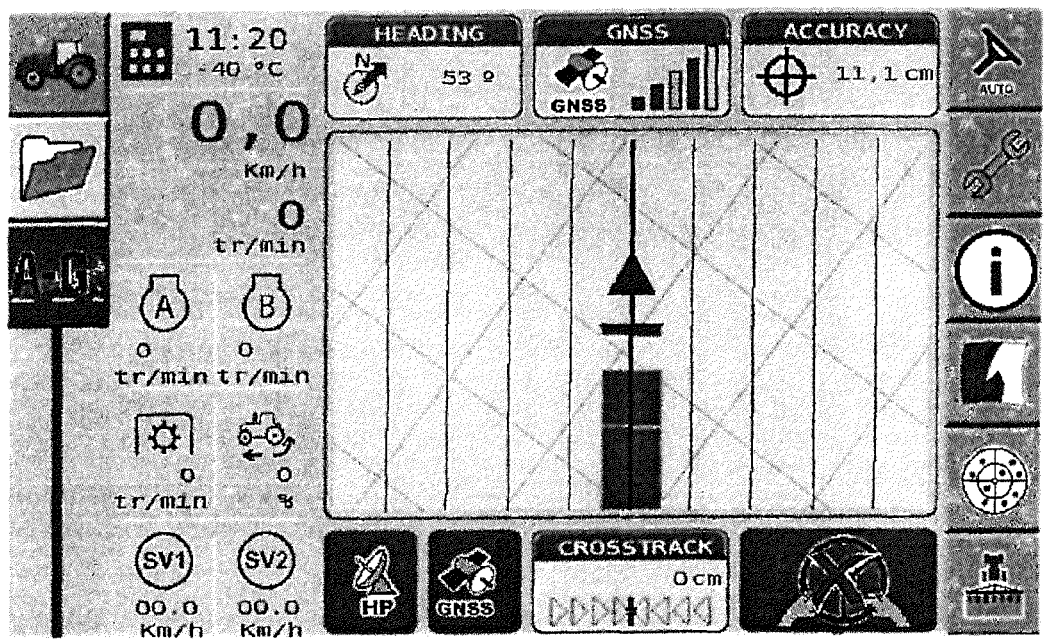
FIG. 4 is an exemplary screen display of the display system showing a magnified top view representation of the vehicle's current location on a cartographic map along with other data and read-outs.
Figure 5:
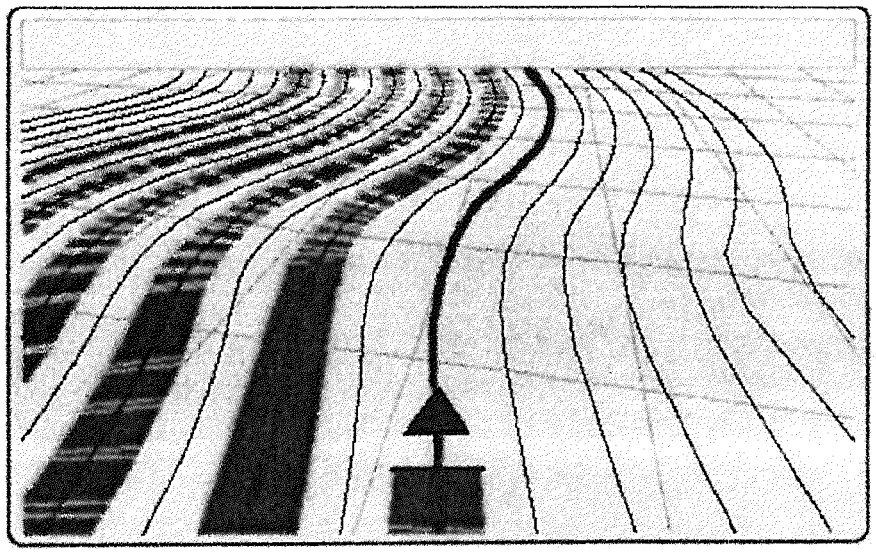
FIG. 5 is an exemplary screen display of the display system showing a perspective view representation of the vehicle's current location on a cartographic map.
Figure 6:
FIG. 6 is an exemplary screen display of the display system showing another perspective view along with other data and read-outs.

Any time after the location determining component 18 calculates or otherwise acquires the vehicle's current position, the display 24 may present a cartographic map that shows a representation of the vehicle's current location as well as its surroundings as depicted in step 712. Examples of such cartographic maps are shown in FIGS. 3-6. As mentioned above, the cartographic maps may be displayed with different viewing modes such as different fields of view, magnification levels, etc. For example, FIG. 3 shows a cartographic map with a top or plan field of view, FIG. 4 shows a cartographic map with a magnified top or plan field of view along with other data and readouts, FIG. 5 shows a cartographic map with a perspective or horizon field of view, and FIG. 6 shows a cartographic map with a magnified perspective or horizon field of view along with other data and readouts. The present invention is not limited to the particular viewing modes shown in FIGS. 3-6 but instead be used with any viewing modes or other data and read-outs.

While the vehicle is operated, the control device 20 receives signals or data from the inputs 16 to monitor the operating state of the vehicle and/or implements or other devices attached to or mounted on the vehicle as depicted in step 714. For example, as discussed above, the control device may monitor whether an implement is raised or lowered, whether a sprayer or applicator is being operated or is disabled, whether the vehicle is approaching a field boundary or obstacle, and/or whether the vehicle guidance system is enabled or disabled. The control device may also monitor the weather, the vehicle's fuel level, the time of day, the amount of ambient light, or any other operating state of the vehicle and/or operating state of devices attached to the vehicle.

The control device 20 may then select a viewing mode for the display 24 based on the operating state of the vehicle and/or devices attached to it as depicted in step 716. The control device then switches the display 24 to this viewing mode as depicted in step 718.

For example, the operating state may be a position or orientation of an implement coupled with the vehicle, and the viewing mode may be a field of view of the display 24. The control device 20 may be configured to switch the display 24 to a perspective view whenever the implement is raised and to switch the display to a top view whenever the implement is lowered.

In another embodiment, the operating state may be a status of a sprayer coupled with the vehicle, and the control device 20 may be configured to switch the display 24 to a perspective view whenever the sprayer is disabled and to switch the display to a top view whenever the sprayer is being operated.

In another embodiment, the operating state may be a location of the vehicle relative to a field boundary, and the control device may be configured to switch the display to a perspective view whenever the vehicle is greater than a threshold distance from the boundary and to switch the display to a top view whenever the vehicle is less then the threshold distance from the boundary.

The table below lists the above-described viewing modes and other exemplary viewing modes for designated operating states.

| Operating State | Viewing Mode |
| --- | --- |
| Raise Implement | Switch to Perspective/Horizon View |
| Lower Implement | Switch to Plan/Top View |
| Sprayer/Applicator/Planter On | Switch to Plan/Top View |
| Sprayer/Applicator/Planter Off | Switch to Perspective/Horizon View |
| Approach Field Boundary | Switch to Plan View and Increase Zoom |
| Steering Wheel Moved While in Auto Steer | Switch to Perspective/Horizon View |
| Approach Field Marker or Obstruction | Switch to Perspective/Horizon View |
| Sprayer/Applicator/Planter Transitions Between on/off | Switch to Plan/Top View and Zoom |
| Dusk Approaching | Switch to Perspective/Horizon View |
| User Selected Operating State #1 | User Selected Viewing Mode |
| User Selected Operating State #2 | User Selected Viewing Mode |
| User Selected Operating State #3 | User Selected Viewing Mode |

After the control device 20 selects a viewing mode, it may continue to monitor the operating state of the vehicle and/or devices attached to the vehicle and may switch between the display modes in accordance with the detected operating states. For example, the control device 20 may switch to a plan/top view whenever an implement is lowered but may switch back to a perspective/horizon view if the vehicle guidance system is disengaged and/or the vehicle approaches a field boundary. The control device 20 may then switch back to a plan view as soon as the vehicle guidance system is re-engaged and/or the vehicle moves away from a field boundary.

The control device 20 also permits an operator to enter user-defined operating states and to assign user-defined viewing modes for the entered operating states. For example, an operator may program the control device 20 to automatically switch to a perspective/horizon view of a selected zoom at a particular time each day to serve as a reminder of a break time.

The control device 20 may also be programmed to slowly transition between viewing modes when triggered by a change in an operating state. For example, the control device may switch to a perspective/horizon view while the vehicle is near the center of a field but may slowly transition to a top/plan view and/or slowly increase the zoom level of the display as the vehicle approaches a field boundary and/or an obstacle.

The control device 20 may also be programmed to zoom-in on a particular portion of the vehicle and/or devices attached to the vehicle as an operating state changes. For example, the display 24 may zoom-in on an implement, or a portion of an implement, as the implement is being turned on or off so the operator can ensure the implement is operating properly.

As the guidance system 10 guides the vehicle 12 along the desired path, the location determining component 18 or other device periodically or continuously compares the current location of the vehicle with the ending point of the desired path as depicted in step 720. Once the vehicle 12 reaches the end of the desired path, the method terminates or returns to some other function at step 722. Otherwise, it repeats steps 710-718 until the vehicle completes the desired path.

Although the invention has been described with reference to the embodiments illustrated in the attached drawings, it is noted that equivalents may be employed and substitutions made herein without departing from the scope of the invention as recited in the claims. For example, the methods disclosed herein and illustrated in FIG. 7 may be performed in any order and steps may be added or deleted without departing from the scope of the invention as recited in the claims. Also, the user-configurable steering parameter may include parameters such as steering gain, steering sensitivity, steering force, etc.

Having thus described an embodiment of the invention, what is claimed as new and desired to be protected by Letters Patent includes the following:

1. A display system for an agricultural vehicle, the display system comprising:
   a display for displaying a representation of the vehicle's location in a field in which the vehicle is operating; and
   a control device for receiving an indication of an operating state of the vehicle and for controlling a viewing mode of the display according to the operating state, wherein the operating state is a location of the vehicle relative to a field boundary, the viewing mode is a field of view of the display, and the control device is configured to switch the display to a perspective view whenever the vehicle is greater than a threshold distance from the boundary and to switch the display to a top view whenever the vehicle is less then the threshold distance from the boundary.

2. The display system as set forth in claim 1, wherein the operating state is a position of an implement coupled with the vehicle, the viewing mode is a field of view of the display, and the control device is configured to switch the display to a perspective view whenever the implement is raised and to switch the display to a top view whenever the implement is lowered.

3. The display system as set forth in claim 1, wherein the operating state is a status of a sprayer coupled with the vehicle, the viewing mode is a field of view of the display, and the control device is configured to switch the display to a perspective view whenever the sprayer is disabled and to switch the display to a top view whenever the sprayer is operated.

4. The display system as set forth in claim 1, wherein the operating state is a status of a vehicle guidance system, the viewing mode is a field of view of the display, and the control device is configured to switch the display to a perspective view whenever the vehicle guidance system is engaged and to switch the display to a plan view whenever the vehicle guidance system is disengaged.

5. The display system as set forth in claim 1, wherein the operating state is a location of the vehicle relative to a field boundary, the viewing mode is a field of view of the display and a magnification level of the display, and the control device is configured to switch the display to a perspective view and a first magnification level whenever the vehicle is greater than a threshold distance from the boundary and to switch the display to a top view and to a second magnification level greater than the first magnification level whenever the vehicle is less then the threshold distance from the boundary.

6. A guidance system for an agricultural vehicle, the guidance system comprising:
   a satellite system receiver for receiving signals from a plurality of navigation satellites and for determining locations of the agricultural vehicle as a function of the signals;
   a display responsive to the satellite system receiver for displaying a representation of the vehicle's location on a cartographic map; and
   a control device configured for:
      receiving location data from the satellite system receiver;
      comparing the location data to cartographic data for a desired path of the vehicle;
      producing steering commands to be delivered to a steering actuator;
      receiving an indication of an operating state of the vehicle; and
      controlling a viewing mode of the display according to the operating state, wherein the operating state is a position of the vehicle relative to a field boundary, the viewing mode is a field of view of the display, and the control device is configured to switch the display to a perspective view whenever the vehicle is greater than a threshold distance from the boundary and to switch the display to a plan view whenever the vehicle is less then the threshold distance from the boundary.

7. The guidance system as set forth in claim 6, wherein the operating state is a position of an implement coupled with the vehicle, the viewing mode is a field of view of the display, and the control device is configured to switch the display to a perspective view whenever the implement is raised and to switch the display to a plan view whenever the implement is lowered.

8. The guidance system as set forth in claim 6, wherein the operating state is a status of a spray coupled with the vehicle, the viewing mode is a field of view of the display, and the control device is configured to switch the display to a perspective view whenever the sprayer is disabled and to switch the display to a plan view whenever the sprayer is operated.

9. The guidance system as set forth in claim 6, wherein the operating state is a status of a vehicle guidance system, the viewing mode is a field of view of the display, and the control device is configured to switch the display to a perspective view whenever the vehicle guidance system is enabled and to switch the display to a plan view whenever the vehicle guidance system is disabled.

10. The guidance system as set forth in claim 6, wherein the operating state is a location of the vehicle relative to a field boundary, the viewing mode is a field of view of the display and a magnification level of the display, and the control device is configured to switch the display to a perspective view and a first magnification level whenever the vehicle is greater than a threshold distance from the boundary and to switch the display to a top view and to a second magnification level greater than the first magnification level whenever the vehicle is less then the threshold distance from the boundary.

11. A guidance system for an agricultural vehicle, the guidance system comprising:
   a satellite system receiver for receiving signals from a plurality of navigation satellites and for determining locations of the agricultural vehicle as a function of the signals;
   a display responsive to the satellite system receiver for displaying a representation of the vehicle's location on a cartographic map, wherein the display can show at least two different perspective views; and
   a control device configured for:
      receiving location data from the satellite system receiver;
      comparing the location data to cartographic data for a desired path of the vehicle;
      producing steering commands to be delivered to a steering actuator;
      receiving an indication of an operating state of an implement or applicator attached to the vehicle; and
      controlling a viewing mode of the display according to the operating state.

12. The guidance system as set forth in claim 11, wherein the viewing mode is a field of view of the display, and the control device is configured to switch the display to a perspective view whenever the implement is raised and to switch the display to a plan view whenever the implement is lowered.

13. The guidance system as set forth in claim 11, wherein the viewing mode is a field of view of the display, and the control device is configured to switch the display to a perspective view whenever the sprayer is disabled and to switch the display to a plan view whenever the sprayer is operated.

14. The guidance system as set forth in claim 11, wherein the operating state is a position of the vehicle relative to a field boundary, the viewing mode is a field of view of the display, and the control device is configured to switch the display to a perspective view whenever the vehicle is greater than a threshold distance from the boundary and to switch the display to a plan view whenever the vehicle is less then the threshold distance from the boundary.

* * * * *